United States Patent

Boella et al.

[11] Patent Number: 5,289,105
[45] Date of Patent: Feb. 22, 1994

[54] VOLTAGE-REGULATOR CIRCUIT FOR A SYSTEM FOR RECHARGING THE BATTERY OF A MOTOR VEHICLE

[75] Inventors: Marcello Boella, Ivrea; Valerio Giorgetta, Moncucco Torinese, both of Italy

[73] Assignee: Marelli Autronica S.p.A., Milan, Italy

[21] Appl. No.: 779,859

[22] Filed: Oct. 21, 1991

[30] Foreign Application Priority Data

Oct. 22, 1990 [IT] Italy ................ 67811 A/90

[51] Int. Cl.$^5$ ................................ H02J 7/14
[52] U.S. Cl. ........................ 322/25; 322/28; 320/64
[58] Field of Search .......... 322/25, 27, 28, 72, 322/73, 90, 99; 320/64, 68; 323/282, 284

[56] References Cited

U.S. PATENT DOCUMENTS

| | | | |
|---|---|---|---|
| 4,446,417 | 5/1984 | Fox et al. | 322/25 |
| 4,658,200 | 4/1987 | Kouge | 322/25 |
| 4,716,355 | 12/1987 | Morishita et al. | 320/64 |
| 4,839,576 | 6/1989 | Kaneyuki et al. | 322/25 |
| 4,940,928 | 7/1990 | Nishimura | 322/28 |
| 5,013,995 | 5/1991 | Rashid | 322/25 |
| 5,013,996 | 5/1991 | Conzelmann et al. | 322/28 |
| 5,151,646 | 9/1992 | Vercesi et al. | 322/28 |
| 5,173,654 | 12/1992 | Boella et al. | 322/25 |

FOREIGN PATENT DOCUMENTS 116482 8/1984 European Pat. Off. .
214781 3/1987 European Pat. Off. .

Primary Examiner—Kristine L. Peckman
Attorney, Agent, or Firm—Sughrue, Mion, Zinn, Macpeak & Seas

[57] ABSTRACT

The circuit includes sensors for supplying electrical signals indicative of the current flowing in the field winding of the generator in operation and a control circuit operatively connected to the sensors. The control circuit is arranged to control the transistor which drives the field winding so that the voltage at the battery terminals remains substantially constant with variations in the current supplied to the battery by the generator.

2 Claims, 1 Drawing Sheet

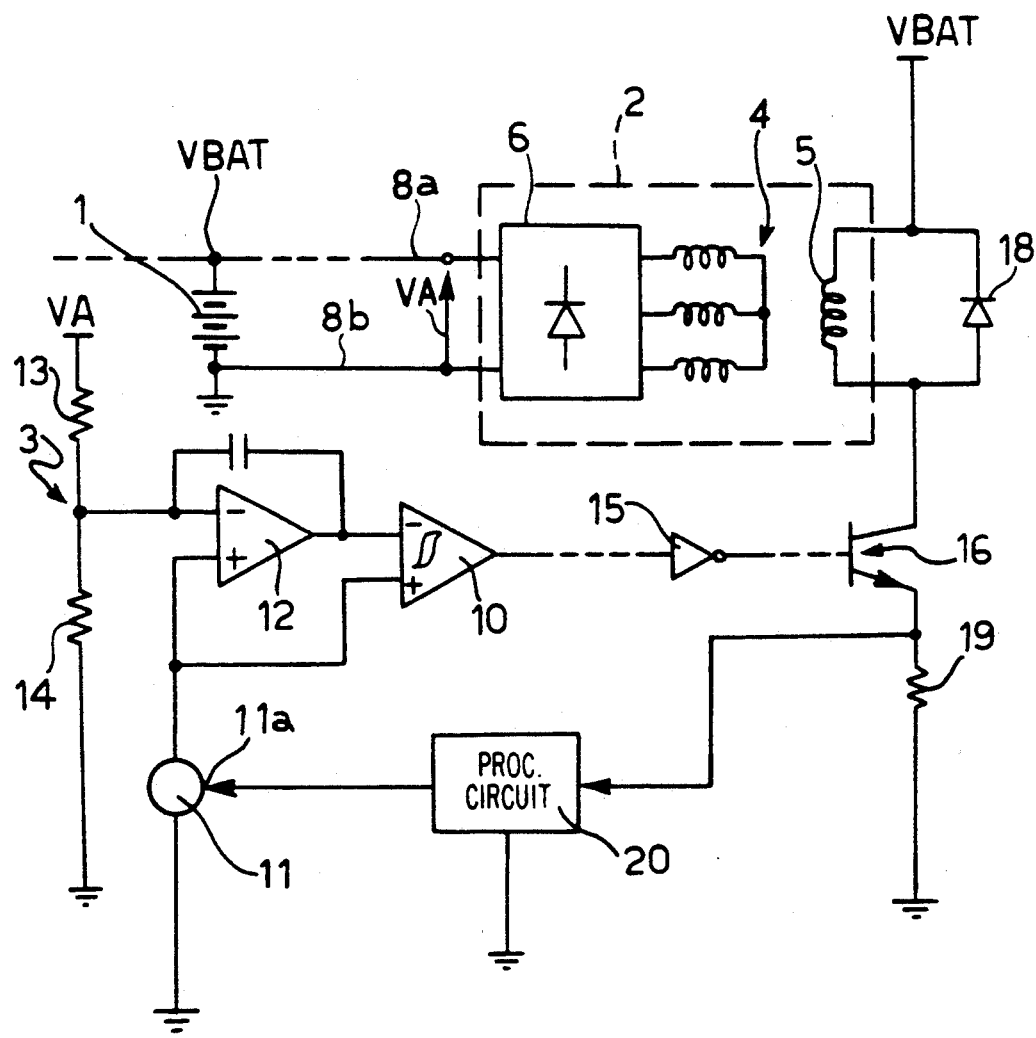

VOLTAGE-REGULATOR CIRCUIT FOR A SYSTEM FOR RECHARGING THE BATTERY OF A MOTOR VEHICLE

BACKGROUND OF THE INVENTION

The present invention relates to a voltage-regulator circuit for a system for recharging the battery of a motor vehicle which includes an electrical generator including an alternator with an armature winding and a field winding, and a rectifier, in which the output of the generator is connected to the battery by at least one connecting wire, the voltage-regulator circuit including:

a driver transistor whose collector-emitter path is in series with the field winding of the generator between the two poles of a source of a direct-current voltage, and a control circuit adapted to pilot the transistor in an on-off manner in response the value assumed by the voltage supplied by the generator in comparison with a reference voltage.

In voltage-regulator circuits of this type produced up to now, when the current supplied by the generator increases in operation, the voltage applied to the battery terminals tends to decrease. The voltage drop in the connecting wire or wires between the electrical generator and the battery contributes to this.

In order to reduce the variability of the voltage applied to the battery terminals with variations in the current supplied by the generator, it is necessary to provide a connecting wire between the positive pole of the battery and the voltage-regulator circuit (to supply that circuit with information relating to the instantaneous value of the voltage applied to the (battery). This is a disadvantage because it makes the wiring more complicated and also because, if the voltage-regulator circuit is in the form of an integrated circuit, it is necessary to provide a further terminal (pin).

SUMMARY OF THE INVENTION

The object of the present invention is to provide a voltage-regulator circuit which overcomes these problems.

According to the invention, the foregoing object is achieved by a voltage-regulator circuit of the type specified above, whose main characteristic lies in the fact that it also includes sensor means for supplying an electrical signal indicative of the current flowing in the field winding in operation, and in that the control circuit is operatively connected to the sensor means and is arranged to control the driver transistor in dependence on the signal supplied by the sensor means so that the voltage applied to the battery terminals remains substantially constant with variations in the current supplied to the battery by the generator.

Further characteristics and advantages of the invention will become clear from the detailed description which follows with reference to the appended drawing provided purely by way of non-limiting example, which is a diagram, partially in block form, of a voltage-regulator circuit according to the invention.

BRIEF DESCRIPTION OF THE DRAWINGS

The sole Figure is a circuit diagram of the voltage regulator circuit according to the present invention.

DETAILED DESCRIPTION OF THE INVENTION

With reference to the drawing, a recharging system used to recharge the battery 1 of a motor vehicle includes a current-generator, generally indicated 2, and an associated voltage-regulator circuit, generally indicated 3.

In known manner, the generator 2 includes an alternator with a three-phase armature winding 4 (connected in a star arrangement in the embodiment shown by way of example) and a field winding 5. The armature winding 4 of the alternator is connected to a three-phase, full-wave rectifier 6 formed with semiconductor diodes. The output of the rectifier 6 represent the output of the generator 2 as a whole and is connected to the battery by connected wires 8a and 8b.

The voltage output by the generator 2 is indicated $V_A$ and the voltage applied to the terminals of the battery 1 is indicated VBAT. These voltages differ by the voltage drop in the connecting wires 8a and 8b.

The voltage-regulator circuit 3 includes a threshold comparator 10 with hysteresis which has a non-inverting input connected to a reference-voltage generator 11 and an inverting input connected to the output of an integrator circuit 12. The input of the integrator circuit is connected to the central tap of a voltage divider formed by two resistors 13 and 14 which divide the voltage $V_A$ output by the generator 2 in a predetermined ratio.

The output of the threshold comparator 10 is connected by an invertor 15 to the base of a power driver transistor 16 which, in the embodiment illustrated, is a bipolar npn-type transistor. Alternatively, the transistor 16 could, for example, be a MOS-type transistor.

The field winding 5 of the generator 2 is connected between the collector of the transistor 16 and the positive pole of the battery 1. A recirculating diode 18 is connected in parallel with the winding 5.

A resistor 19 is arranged between the emitter of the transistor 16 and earth and acts as a sensor of the excitation current flowing in the field winding 5 in operation. The non-earthed terminal of the resistor 19 is connected to a processing circuit 20 which outputs a signal indicative of the average current flowing in the resistor 19 and hence of the current flowing in the field winding 5. For example, the circuit 20 may comprise a sample-and-hold circuit.

The output of the processing circuit 20 is connected to a control input 11a of the reference-voltage generator 11. This generator is arranged to output a reference voltage which is variable in dependence on the signal applied to its input 11a. In particular, the generator 11 and the processing circuit 20 are formed in such a way that the reference voltage output by the generator 11 increases when the average current flowing in the field winding 5 increases.

This characteristic enables the voltage VBAT at the terminals of the battery 1 to be kept substantially constant when the current supplied by the generator 2 increases (the resistances of the connections 8a and 8b being known), unlike prior-art systems in which the available voltage tends to decrease when the current supplied increases.

In particular, the regulator circuit described above recovers, that is, compensates for, the voltage lost in the connecting cables 8a and 8b between the generator and the battery 1, with the advantage that a connecting wire between the positive pole of the battery and the voltage-regulator circuit, which is necessary in systems currently in use, is no longer required. Thus, if the regulator circuit is in the form of an integrated circuit, one less terminal (pin) is required.

Naturally, the principle of the invention remaining the same, the forms of embodiment and details of construction may be varied widely with respect to those described and illustrated purely by way of non-limited example, without thereby departing from the scope of the present invention.

We claim:

1. A voltage-regulator circuit for a system for recharging a battery of a motor vehicle comprising an electrical generator including an alternator with an armature winding and a field winding, and a rectifier, in which the output of the generator is connected to the battery by at least one connecting wire, the voltage-regulator circuit including:
   a driver transistor whose collector-emitter path is intended to be connected in series with the field winding of the generator between two poles of a source of a direct-current voltage, and
   a control circuit adapted to pilot the transistor in an on-off manner in dependence on the value assumed by a voltage supplied by the generator in comparison with a reference voltage, and
   sensor means for supplying an electrical signal indicative of a current flowing in the field winding in operation;
   the control circuit being operatively connected to the sensor means and arranged to control the transistor in dependence on the signal supplied by the sensor means so that a voltage at the terminals of the battery remains substantially constant with variations in a current supplied to the battery by the generator, and
   the sensor means for sensing the current flowing in the field winding including a resistor connected in series with the collector-emitter path of the transistor and a processing circuit connected to the resistor and arranged to output a signal indicative of an average voltage developed across the resistor.

2. A voltage-regulator according to claim 1, wherein the processing circuit comprises a sample-and-hold circuit.

* * * * *